United States Patent [19]

Barnum

[11] Patent Number: 5,051,468

[45] Date of Patent: Sep. 24, 1991

[54] POLYMERS COMPRISED OF FULLY AND PARTIALLY HYDROLYZED POLY(VINYL ACETATE) AND ALKYL KETENE DIMER REPEATING UNITS AND AQUEOUS SOLUTIONS CONTAINING SUCH POLYMERS

[75] Inventor: Paquita E. Barnum, Newark, Del.

[73] Assignee: Aqualon Company, Wilmington, Del.

[21] Appl. No.: 291,939

[22] Filed: Dec. 30, 1988

[51] Int. Cl.$^5$ .................................................. C08F 8/00
[52] U.S. Cl. ........................................ 525/59; 525/61
[58] Field of Search .................................... 525/59, 61

[56] References Cited

U.S. PATENT DOCUMENTS

| | | | |
|---|---|---|---|
| 3,560,464 | 2/1971 | Toyoshima et al. | 525/60 |
| 3,753,954 | 8/1973 | Ohmori et al. | 525/61 |
| 4,249,000 | 2/1981 | Batzer et al. | 525/59 X |
| 4,287,311 | 9/1981 | Taniguchi et al. | 525/58 |
| 4,314,042 | 2/1981 | Goto et al. | 525/59 |
| 4,363,836 | 12/1982 | Sakato et al. | 525/60 X |
| 4,368,323 | 1/1983 | James | 525/61 X |
| 4,845,207 | 7/1989 | t'Sas | 536/91 |

FOREIGN PATENT DOCUMENTS

| | | |
|---|---|---|
| 295628 | 12/1988 | European Pat. Off. |
| 7033189 | 10/1968 | Japan |
| 49-77992 | 7/1974 | Japan |
| 49-86435 | 8/1974 | Japan |
| 1268784 | 11/1986 | Japan ............ 525/59 |

Primary Examiner—Joseph L. Schofer
Assistant Examiner—J. M. Reddick
Attorney, Agent, or Firm—Mark D. Kuller

[57] ABSTRACT

Polymers having the general idealized structure:

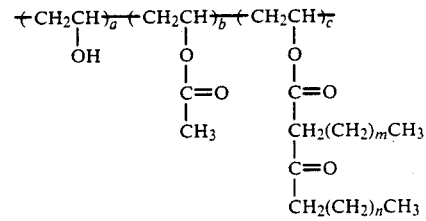

wherein a, b and c represent the number of monomer units of each respective monomer, the sum of a and b is 200 to 5000, b is the product of a multiplied by 0 though 0.25, c/(a+b)=0.0001 to 0.006, m is 5 to 21, and the sum of m and n is 10 to 42, and aqueous solutions comprising such polymers, are disclosed.

14 Claims, No Drawings

POLYMERS COMPRISED OF FULLY AND PARTIALLY HYDROLYZED POLY(VINYL ACETATE) AND ALKYL KETENE DIMER REPEATING UNITS AND AQUEOUS SOLUTIONS CONTAINING SUCH POLYMERS

This invention is directed to novel polymers prepared by grafting alkyl ketene dimer to fully and partially hydrolyzed poly(vinyl acetate), and to aqueous solutions containing such polymers.

BACKGROUND OF THE INVENTION

Control of rheology of aqueous systems using water-soluble polymers is well-known. For instance, fully and partially hydrolyzed poly(vinyl acetate) have been used as thickeners in aqueous systems such as latex paints, and steric stabilizers and emulsion aids in suspension and emulsion polymerization. The thickening efficiency of fully and partially hydrolyzed poly(vinyl acetate) is quite low as compared to other water-soluble polymers, requiring higher molecular weight polymers to generate even a moderate thickening power. Therefore, there has been a need to improve the ability to control rheology using fully and partially hydrolyzed poly(vinyl acetate). According to this invention, this objective is achieved by grafting alkyl ketene dimer to fully and partially hydrolyzed poly(vinyl acetate). Other advantages of such polymers are described below.

SUMMARY OF THE INVENTION

This invention is directed to polymers having the general idealized structure:

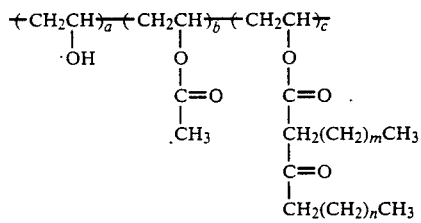

wherein a, b and c represent the number of monomer units of each respective monomer, the sum of a and b is 200 to 5000, b is the product of a multiplied by 0 though 0.25, $c/(a+b) = 0.0001$ to 0.006, m is 5 to 21, and the sum of m and n is 10 to 42, and aqueous solutions comprising the same.

DETAILED DESCRIPTION OF THE INVENTION

The polymers of this invention are nonionic and have a 3% aqueous Brookfield viscosity at 25° C. of 100 to 260,000 cps, preferably 150,000 to 260,000 cps. They are mainly comprised of vinyl acetate and vinyl alcohol (hydrolyzed vinyl acetate) repeating units. They have additional repeating units derived from one or more alkyl ketene dimer. Alkyl ketene dimers are available under the trademark Aquapel from Hercules Incorporated, Wilmington, Del.

In the above idealized formula, the sum of a and b is preferably 1500 to 3000 monomer units, b is preferably the product of a multiplied by 0.08 though 0.20, most preferably multiplied by 0.11 through 0.13, m is preferably 13 to 19, and the sum of m and n is preferably 26 to 38. Preferably $c/(a+b) = 0.0004$ to 0.003.

The polymers of this invention may be prepared by reaction of the alcohol moieties of fully or partially hydrolyzed poly(vinyl acetate) with alkyl ketene dimers. According to one process for preparing the polymers of this invention, fully or partially hydrolyzed poly(vinyl acetate) is dissolved in a dipolar, nonhydroxylic solvent (e.g., dimethyl sulfoxide, dimethyl formamide or dimethyl acetamide) at 50° to 120° C. under nitrogen. Then, solid alkyl ketene dimer is added to the reaction mixture and the mixture is maintained at 100° to 120° C. under positive nitrogen pressure until grafting occurs. Then, the reaction mixture is cooled to about 25°-100° C. and added dropwise to solvent (e.g, mixtures of methanol and acetone) in order to precipitate the polymer from solution. The suspended solids are then filtered, washed with an additional amount of solvent, and the polymer is recovered by vacuum filtration. The polymer is then suspended in a swelling solvent (e.g., methylene chloride) at reflux for 2 hours in order to remove entrapped solvent.

Aqueous solutions prepared with the polymers of this invention in amounts up to about 2.5 weight percent exhibit plastic solution rheology, i.e., the apparent solution viscosity decreases with shear, even at low shear rates. In addition, they achieve higher aqueous system viscosity than poly(vinyl alcohol) polymers having comparable molecular weight at similar concentrations. The polymers of this invention formed thixotropic gels in aqueous solutions at polymer concentrations between 2 to 3.5 weight percent. Further, aerated solutions of the polymers form stable foams when dry.

The solubility of the polymers of this invention is a function of the acetyl content and the amount of alkyl ketene dimer grafted to the polymer. The greater the degree of hydrolysis beyond about 87 to 89 monomer mole % (i.e., the lower the acetyl content) the lower the solubility in water. The larger the amount of alkyl ketene dimer grafted to the polymer the lower the solubility.

The viscosity of solutions decreases with increases in temperature. The temperature dependence of the viscosity is a function of the shear rate at which the measurement is taken.

The reduction in surface tension attributable to the polymers of this invention is comparable to similar poly(vinyl alcohol) solutions.

The invention is further illustrated by the following Examples, wherein all parts, percentages, etc., are by weight and all water was deionized, distilled water, unless otherwise indicated.

EXAMPLE 1

First, 10 g (0.23 monomer moles) fully hydrolyzed poly(vinyl acetate) (poly(vinyl alcohol)) of average molecular weight 86,000 (Aldrich Chemical Co., Milwaukee, Wis.) and 170 ml of dimethyl acetamide were charged to a 250 ml three-necked round bottom flask, equipped with a magnetic stir bar, reflux condenser, nitrogen inlet and bubbler. The mixture was brought to 135° C. and was held at this temperature until all of the polymer dissolved (approximately 60 minutes). Then, the solution was allowed to cool to 110° C. and 0.186 g (0.3 millimoles) of Aquapel 364 alkyl ketene dimer in 5 ml of N,N-dimethyl acetamide was added to the solution. The solution was maintained at 110° C. for 24 hours under nitrogen. Then, the solution was cooled to 100° C. and was added dropwise to a stirring solution of methanol and acetone (50/50 mixture, by volume) in order to precipitate the polymer from solution. The suspended solids were filtered through a coarse fritted glass funnel and were washed with an additional amount of the methanol/acetone mixture. The polymer beads were suspended in refluxing methylene chloride for a 2 hour period to remove residual N,N-dimethyl acetamide. The polymer was then recovered by vacuum filtration through a coarse fritted glass funnel to afford the product as tan beads (11.03 g).

An aqueous solution of the resultant polymer was prepared by dissolving 4 g of the polymer in 96 ml distilled water at 100° C. The solution was strained through a mesh screen and was found to have a 3.54 weight % total solids. It was allowed to cool to room temperature overnight to allow full viscosity development. Then, the Brookfield LVT viscosity was measured at various shear rates with a #4 spindle. The first measurement was taken at 0.3 rpm and subsequent measurements were taken at increased shear measured at intervals of less than one minute. The results are in Table 1.

EXAMPLE 2

The solution prepared in Example 1 was diluted with water to a concentration of 3 weight %. After the solution was mixed, the Brookfield LVT viscosity was immediately measured. Full viscosity had not been allowed to develop. The results are in Table 1.

EXAMPLE 3

The solution prepared in Example 2 was allowed to sit at room temperature overnight, after which its Brookfield LVT viscosity was measured at various viscosities at less than one minute intervals. The results are in Table 1.

It was confirmed that the plateau viscosity had been reached in the 24 hour period of the above test by remeasuring the viscosity after letting the solution sit for several days.

EXAMPLE 4

The procedures of Example 1 were repeated except using 0.23 g (0.41 millimoles) of Aquapel 364 alkyl ketene dimer. The product was 11.05 g of tan beads.

An aqueous solution of the resultant polymer was prepared by dissolving 4 g of the polymer in 96 ml distilled water at 100° C. The solution was strained through a mesh screen and was found to have a 3.07 weight % total solids. It was allowed to cool to room temperature overnight to allow full viscosity development. Then, the Brookfield LVT viscosity was measured at various shear rates with a #4 spindle. The first measurement was taken at 0.3 rpm, and subsequent measurements were taken at increased shear measured at intervals of less than one minute. The results are in Table 1.

EXAMPLE 5

The solution prepared in Example 4 was diluted with water to a concentration of 2.0 weight %. It was allowed to cool to room temperature overnight to allow full viscosity development. Then, the Brookfield LVT viscosity was measured at various shear rates with #2 and 3 spindles. The first measurement was taken at 6.0 rpm, and subsequent measurements were taken at increased shear measured at intervals of about 2.5 to 4 minutes, when the reading had stabilized. The results are in Table 1.

EXAMPLE 6

The solution prepared in Example 4 was diluted with water to a concentration of 1.0 weight %. It was allowed to cool to room temperature overnight to allow full viscosity development. Then, the Brookfield LVT viscosity was measured at various shear rates with #2 spindle. The results are in Table 1.

EXAMPLE 7-10 (CONTROL)

First, 4 g fully hydrolyzed poly(vinyl acetate) (poly(vinyl alcohol)) of average molecular weight 86,000 (Aldrich Chemical Co., Milwaukee, Wis.) was dissolved in in 96 ml water at 100° C. to form poly(vinyl alcohol) solution (Sample 7). Then, portions of this sample were diluted to 3, 2 and 1 weight % concentrations (Samples 8, 9 and 10, respectively). The Brookfield LVT viscosities of these solutions were measured at intervals of 2.5 to 4 minutes, when the readings stabilized, at the shear rates indicated in Table 1 with a #2 spindle. The results are in Table 1.

EXAMPLE 11

First, 30 g (0.68 monomer moles) partially hydrolyzed (88 monomer mole %) poly(vinyl acetate) of average molecular weight 125,000 (Aldrich Chemical Co., Milwaukee, Wis.) and 510 ml of dimethyl sulfoxide were charges to a 1 liter three-necked round bottom flask, equipped with a magnetic stirrer, reflux condenser, nitrogen inlet and bubbler. The mixture was brought to 55° C. and was held at this temperature until all of the polymer dissolved (approximately 60 minutes). Then, 0.9 g (1.6 millimoles) solid Aquapel 364 alkyl ketene dimer was added to the solution and the solution was maintained at 100° C. for 24 hours under nitrogen. The solution was cooled to room temperature, and was added dropwise to a stirring solution of methanol and acetone (50/50 mixture, by volume) in order to precipitate the polymer from solution. The recovered solids were suspended in refluxing methylene chloride for a 2 hour period to removed residual dimethyl sulfoxide. Afterwards refluxing was repeated for 3 hours. The polymer was then recovered by vacuum filtration through a coarse fritted glass funnel to afford the product as tan beads (29.0 g).

An aqueous solution of the resultant polymer was prepared by heating 1 g of the polymer in 49 ml distilled water at 70° C. for 1 hour. Total solids was determined to be 1.96 weight %. The solution was allowed to cool to room temperature overnight to allow full viscosity development. Then, the Brookfield LVT viscosity was measured at various shear rates with a #4 spindle. The first measurement was taken at 0.3 rpm and subsequent measurements were taken at increased shear measured at intervals of less than one minute. The results are in Table 1.

EXAMPLE 12 (CONTROL)

First, 1 g partially hydrolyzed (88 monomer mole %) poly(vinyl acetate) of average molecular weight 125,000 (Aldrich Chemical Co., Milwaukee, Wis.) was dissolved in in 49 ml water at 70° C. for 1 hour. The solution was allowed to cool to room temperature overnight to allow full viscosity development. Then, the Brookfield LVT viscosity was measured at various shear rates with a #2 spindle. The first measurement was taken at 3.0 rpm and subsequent measurements were taken at increased shear measured at intervals of 2.5 to 4 minutes, when the readings stabilized. The results are in Table 1.

TABLE 1

| Example | Shear Rate (rpm) | Brookfield Viscosity (cps) |
|---|---|---|
| 1 | 0.3 | 256,000 |
|  | 0.6 | 142,000 |
|  | 1.5 | 59,600 |
|  | 3.0 | 24,200 |
|  | 6.0 | 15,500 |
|  | 12.0 | 10,250 |
|  | 30.0 | 5,800 |
|  | 60.0 | 3,350 |
| 2 | 60.0 | 80 |
| 3 | 3.0 | 8,000 |
|  | 6.0 | 6,000 |
|  | 12.0 | 4,000 |
|  | 30.0 | 2,200 |
|  | 60.0 | 1,300 |
| 4 | 0.3 | 156,000 |
|  | 0.6 | 89,000 |
|  | 1.5 | 43,200 |
|  | 3.0 | 25,000 |
|  | 12.0 | 7,250 |
|  | 30.0 | 4,100 |
|  | 60.0 | 2,650 |
| 5 | 6.0 | 360 |
|  | 12.0 | 380 |
|  | 30.0 | 288 |
|  | 60.0 | 228 |
| 6 | 6.0 | 7 |
| 7 (Control) | 12.0 | 25 |
|  | 60.0 | 27 |
| 8 (Control) | 60.0 | 14.5 |
| 9 (Control) | 60.0 | 8 |
| 10 (Control) | 60.0 | 5 |
| 11 | 0.3 | 60,000 |
|  | 30.0 | 2,600 |
|  | 60.0 | 1,500 |
| 12 (Control) | 3.0 | 5.8 |
|  | 6.0 | 5.7 |
|  | 30.0 | 6.0 |

The results in Table 1 show the increased viscosity obtained with the alkyl ketene dimer modified polymer of this invention as compared to the control polymers. In addition, they demonstrate the thixotropic behavior of the polymers. This can be seen by, e.g., comparing the results of Examples 2 and 3, wherein viscosity was measured immediately after an aqueous solution was prepared and 1 day after the same solution was prepared.

The polymers of this invention are particularly useful as rheology modifiers for aqueous systems and as oil in water emulsion stabilizers. They are useful as emulsifiers or stabilizers in emulsion and suspension polymerization; as thickeners or rheology modifiers in completion fluids or other petroleum recovery applications; as thickeners or stabilizers in latex paint formulations; as thickeners or rheology modifiers in shampoos, creams and lotions; as web strength additives and sizing agents for paper; as permselective membranes for separation of ionic solutes, organic vapors and gases; as controlled release agents for the administration of drugs; and as encapsulating agents for use in controlled release applications. These polymers are also useful in typical applications for poly(vinyl alcohol), e.g., as water resistant quick setting adhesives for paper converting, as viscosity modifiers in adhesives based on resin formulations such as poly(vinyl alcohol) emulsions, as paper and paperboard sizing, as pigment binder in pigmented coatings, as a temporary protective coating, as a release coating, and as a warp size for yarns in the textile industry, as well as thickeners in industrial coatings formulated on the acidic side. These applications are described by T. W. Modi in Chapter 20 "Polyvinyl Alcohol", Handbook of Water-Soluble Gums and Resins (R. L. Davidson Editor in Chief, McGraw-Hill Book Company 1980).

Typically aqueous protective coating compositions containing a polymer per this invention contain, by weight of the total composition, from about 10% to about 50% of a latex, from about 10% to about 50% of an opacifying pigment (e.g., $TiO_2$, clay, calcium carbonate, silica, talc, etc.), from about 0.1% to about 2% of a dispersant/surfactant (e.g., polyacrylates, potassium tripolyphosphate, 2-amino-2-methyl-1-propanol, etc.) and from about 0.1% to about 1% of the polymers of this invention. Other common ingredients include defoamers, preservatives, surfactants, coalescing agents (e.g., glycols and glycol ethers, etc.), etc. Preferred protective coating compositions are formulated at basic pHs.

While this invention has been described with respect to specific embodiments, it should be understood that these embodiments are not intended to be limiting and that many variations and modifications are possible without departing from the scope of this invention.

What is claimed is:

1. A nonionic, water-soluble polymer having the general idealized structure:

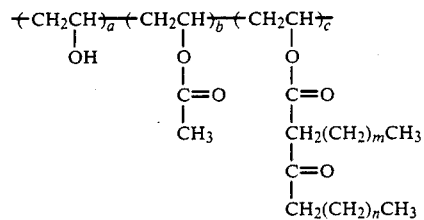

wherein a, b and c represent the number of monomer units of each respective monomer, the sum of a and b is 200 to 5000, b is the product of a multiplied by 0 though 0.25, $c/(a+b)=0.0001$ to 0.006, m is 5 to 21, and the sum of m and n is 10 to 42.

2. The polymer of claim 1 wherein the sum of a and b is 1500 to 3000 monomer units.

3. The polymer of claim 1 wherein b is the product of a multiplied by 0.08 though 0.20.

4. The polymer of claim 1 wherein b is the product of a multiplied by 0.11 through 0.13.

5. The polymer of claim 1 wherein m is 13 to 19.

6. The polymer of claim 1 wherein the sum of m and n is 26 to 38.

7. The polymer of claim 1 wherein $c/(a+b)=0.0004$ to 0.003.

8. The polymer of claim 1 wherein the sum of a and b is 1500 to 3000 monomer units, b is the product of a multiplied by 0.08 though 0.20, m is 13 to 19, and the sum of m and n is 26 to 38, and $c/(a+b)=0.0004$ to 0.003.

9. The polymer of claim 8 wherein b is the product of a multiplied by 0.11 through 0.13.

10. The polymer of claim 1 having a 3% aqueous Brookfield viscosity at 25° C. of 100 to 260,000 cps.

11. The polymer of claim 8 having a 3% aqueous Brookfield viscosity at 25° C. of 100 to 260,000 cps.

12. The polymer of claim 1 having a 3% aqueous Brookfield viscosity at 25° C. of 150,000 to 260,000 cps.

13. The polymer of claim 8 having a 3% aqueous Brookfield viscosity at 25° C. of 150,000 to 260,000 cps.

14. The polymer of claim 9 having a 3% aqueous Brookfield viscosity at 25° C. of 150,000 to 260,000 cps.

* * * * *